(12) United States Patent
Georgescu et al.

(10) Patent No.: US 7,557,641 B2
(45) Date of Patent: Jul. 7, 2009

(54) FRACTIONAL CHARGE PUMP FOR STEP-DOWN DC-DC CONVERTER

(75) Inventors: Sorin S. Georgescu, San Jose, CA (US); Anthony G. Russell, San Jose, CA (US); Chris B. Bartholomeusz, Santa Clara, CA (US)

(73) Assignee: Catalyst Semiconductor, Inc., Santa Clara, CA (US)

( * ) Notice: Subject to any disclaimer, the term of this patent is extended or adjusted under 35 U.S.C. 154(b) by 130 days.

(21) Appl. No.: 11/678,048

(22) Filed: Feb. 22, 2007

(65) Prior Publication Data

US 2007/0194363 A1    Aug. 23, 2007

Related U.S. Application Data

(63) Continuation-in-part of application No. 11/264,884, filed on Nov. 1, 2005, now Pat. No. 7,236,046.

(51) Int. Cl.
*G05F 1/10* (2006.01)
*G05F 3/02* (2006.01)

(52) U.S. Cl. ........................................ 327/536

(58) Field of Classification Search ............ 327/536; 363/59–60
See application file for complete search history.

(56) References Cited

U.S. PATENT DOCUMENTS 5,870,295 A    2/1999   Watanabe
6,198,645 B1 *  3/2001  Kotowski et al. ............ 363/59
6,556,064 B1    4/2003  Yatabe
6,563,235 B1 *  5/2003  McIntyre et al. ............ 307/109
6,762,639 B2    7/2004  Ito et al.
2002/0130705 A1 *  9/2002  Meng et al. .................. 327/536
2005/0110537 A1    5/2005  Wurzer
2007/0018745 A1    1/2007  Knotts et al.

\* cited by examiner

*Primary Examiner*—Quan Tra
(74) *Attorney, Agent, or Firm*—Bever, Hoffman & Harms, LLP; E. Eric Hoffman

(57) ABSTRACT

A charge pump provides a multiplication factor of ⅔ by using a three-phase mode of operation. In a first mode, first and second capacitors are charged from an input voltage while a third capacitor drives the output voltage based on stored charge in the third capacitor. In a second mode, the output terminal is connected to the common node of the first and second capacitors. In a third mode, the voltage potential across the second capacitor is subtracted from the sum of the input voltage and the voltage potential across the first capacitor to generate the output voltage. Operated in this manner, the first, second, and third capacitors will provide the desired ⅔× voltage multiplication. This relatively low multiplication factor can be beneficial in applications requiring 2.5V and 1.8V supplies for integrated circuits, particularly where the input voltage is provided by a lithium battery.

28 Claims, 5 Drawing Sheets

FRACTIONAL CHARGE PUMP FOR STEP-DOWN DC-DC CONVERTER

RELATED APPLICATIONS

This is a continuation-in-part of U.S. patent application Ser. No. 11/264,884 filed Nov. 1, 2005, now U.S. Pat. No. 7,236,046 and entitled, "LED Bias Current Control Using Adaptive Fractional Charge Pump" by Sorin S. Georgescu, Anthony G. Russell and Chris Bartholomeusz.

BACKGROUND OF THE INVENTION

1. Field of the Invention

The invention relates to the field of electronic circuits, and in particular, to an efficient, low noise fractional charge pump.

2. Related Art

Most portable electronic devices contain digital and analog circuits operating at 2.5 Volts or below. However, the battery power used in such devices generally provides a supply voltage that is above the operating voltage of these devices (typically around 3.6 V). For example, a modern rechargeable lithium ion or lithium polymer battery is typically rated to have a nominal output voltage of 3.7 V, but may actually provide a voltage in the range of 2.7 to 4.2 V, depending on the charge state of the battery.

This variability in battery supply voltage necessitates circuitry to step down the supply voltage to the acceptable level. One of the common schemes is to use a charge pump with multiple capacitors. A charge pump can have 2 capacitors equally dividing the battery voltage.

An implementation of such type of charge pump is known as a "½×" charge pump. FIGS. 1A and 1B are schematic diagrams of a conventional ½× charge pump 100, which receives an input voltage V_IN1 and provides a reduced output voltage V_OUT1 to a load D140. Charge pump 100 includes an input terminal 101, charging capacitors C110 and C120, a storage capacitor C130, and an output terminal 102. While not shown for clarity, charge pump 100 also includes interconnect circuitry for connecting capacitors C110 and C120 in the configurations shown in FIGS. 1A and 1B.

Charge pump 100 operates by switching between the two phases of operation shown in FIGS. 1A and 1B. In FIG. 1A, a charging phase is shown, in which capacitors C110 and C120 are serially connected between input terminal 101 and ground, while capacitor C130 is connected between ground and output terminal 102 (load D140 is always connected between output terminal 102 and ground). During this charging phase, capacitors C110 and C120 are charged by input voltage V_IN1 to voltages V11 and V12. Under steady state conditions, capacitors C110 and C120 will both be charged to half of input voltage V_IN1 during this charging phase. Meanwhile, a voltage V13 stored on capacitor C130 is provided as output voltage V_OUT1 for driving load D140.

Then, in a discharging phase shown in FIG. 1B, capacitors C110 and C120 are connected in parallel between input terminal 101 and output terminal 102. Specifically, the positive plate (marked with a triangular indicator) of capacitor C110 is connected to input terminal 101, while the negative plate (unmarked) of capacitor C110 is connected to output terminal 102. Likewise, during the discharging phase, the positive plate (marked) of capacitor C120 is connected to the input terminal 101, while the negative plate (unmarked) of capacitor C120 is connected to output terminal 102.

Because capacitors C110 and C120 are inverted and connected in parallel after input terminal 101, the output voltage V_OUT1 provided during the discharging phase shown in FIG. 1B is equal to the difference of input voltage V_IN1 and the average of voltages V11 and V12 on capacitors C110 and C120, respectively. As described above with respect to FIG. 1A, both capacitors C110 and C120 are charged to half of input voltage V_IN1 during the charging phase. Therefore, the output voltage V_OUT1 provided during the discharging phase is simply equal to one half of input voltage V_IN1 (i.e., 0.5*V_IN1).

Therefore, the output voltage range of ½× charge pump 100 is between 1.35 V and 2.1 V when provided with a lithium ion battery voltage (i.e., 2.7 V to 4.2 V) as in input voltage.

As portable devices become increasingly advanced while at the same time shrinking in size, power efficiencies must continually be improved. While ½× charge pump 100 can provide a reduced supply voltage of half the battery voltage, the battery voltage can vary significantly, thereby resulting in significant variation in the reduced supply voltage. For example, the output voltage range of ½× charge pump 100 is between 1.35 V and 2.1 V when provided with a nominal 3.7 Volt lithium ion battery having a voltage range of 2.7 V to 4.2 V as an input voltage. In this case, the desired nominal output voltage is about 1.85 V. Thus, the output voltage provided by ½× charge pump 100 may be significantly below the desired nominal output voltage. In this case, the available battery charge is small and the efficiency is also small. For this reason, ½× charge pump 100 is not ideally suited for use in all applications.

It would therefore be desirable to have a charge pump capable of applying a multiplication factor greater than ½× and less than 1× to an input voltage. It would also be desirable to have a system and method for stepping down a supply voltage that maximizes power efficiency while minimizing die area requirements.

SUMMARY OF THE INVENTION

Accordingly, the present invention provides a charge pump that applies a ⅔× voltage scaling factor, rather than the conventional 1/1× or ½× scaling factors. As a result, an optimum output voltage can be achieved for a given input voltage, which can beneficially improve power efficiency in situations where conventional charge pumps provide excessive or insufficient voltage multiplication.

In one embodiment, a ⅔× charge pump can include first, second, and third capacitors, with the third capacitor connected between the output terminal of the charge pump and ground. The first and second capacitors are connected in three different connections to the input terminal of the charge pump during three different phases of operation to provide the ⅔× multiplier function.

In a charging phase, the first and second capacitors are connected in series between the input terminal and ground, so that the output terminal is driven by the charge stored on the third capacitor. In a first discharging phase, the output terminal is connected to the common node of the first and second capacitors connected in series, so that the voltage provided at the output terminal is the difference of the input voltage and the voltage across the first capacitor.

Finally, in a second discharging phase, the first and second capacitors are connected between the input terminal and the output terminal, with the first capacitor inverted relative to the input terminal, and the second capacitor having the same orientation as during the charging phase, but connected between the first capacitor and the output terminal. Therefore, the output voltage provided during the second discharging phase is equal to the sum of the input voltage and the voltage potential across the first capacitor, minus the voltage potential across the second capacitor.

By operating the charge pump in this manner, the average voltages on the first and second charge pumps will be one third and two thirds, respectively, of the input voltage, thereby causing the average output voltage provided by the charge pump to be equal to 0.66 times the input voltage.

The invention will be more fully understood in view of the following description and drawings.

DETAILED DESCRIPTION

Conventional charge pumps can generate output voltages that are higher or lower than necessary for many applications. Excess voltage gain must then be attenuated, which results in wasted power (and reduced battery life for devices incorporating conventional charge pumps). Insufficient voltage gain results in low operating efficiency. By providing a charge pump that applies a ⅔× voltage scaling factor, rather than the conventional ¹⁄₁ or ½ scaling factors, an optimum output voltage can be achieved for a given input voltage, which can beneficially improve power efficiency in situations where conventional charge pumps provide either excessive or insufficient voltage.

Figure 2A:
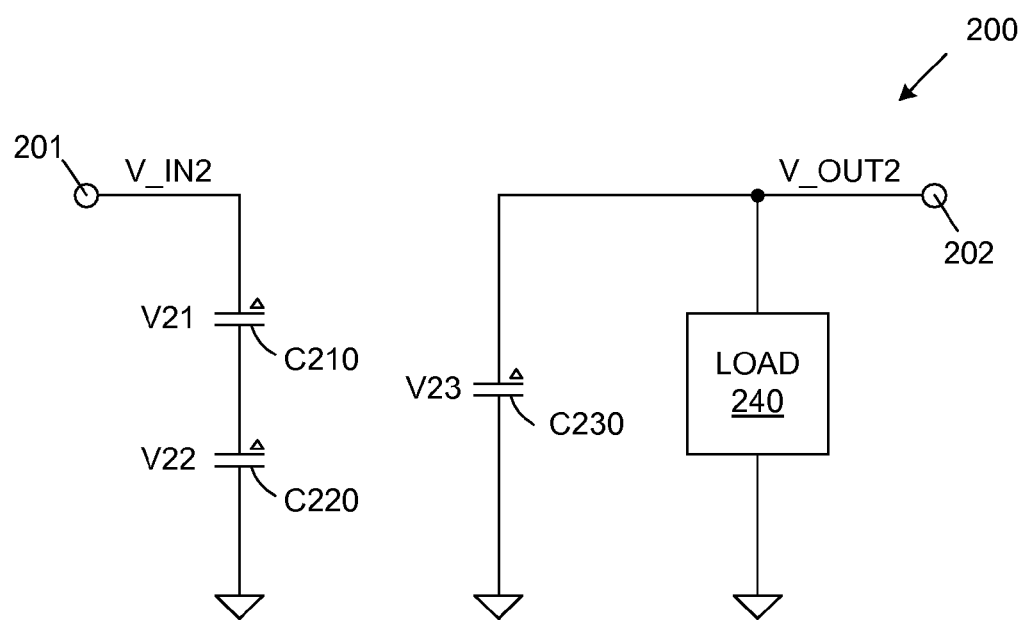
FIGS. 2A, 2B, and 2C are schematic diagrams of the operation of a reduced area ⅔× charge pump, in accordance with an embodiment of the invention.
Figure 2B:
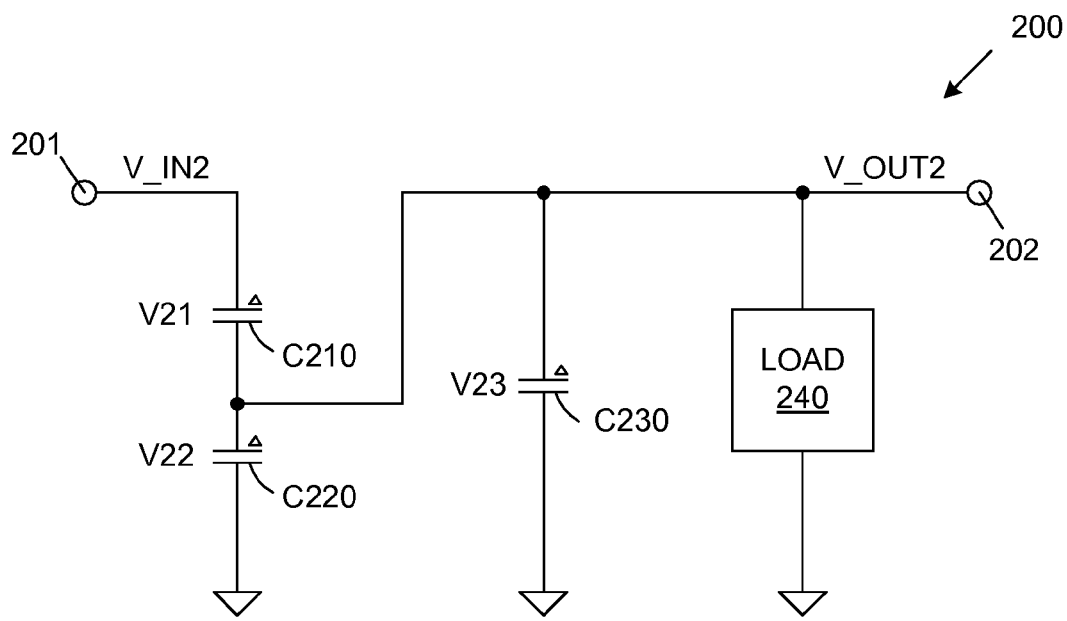
Figure 2C:
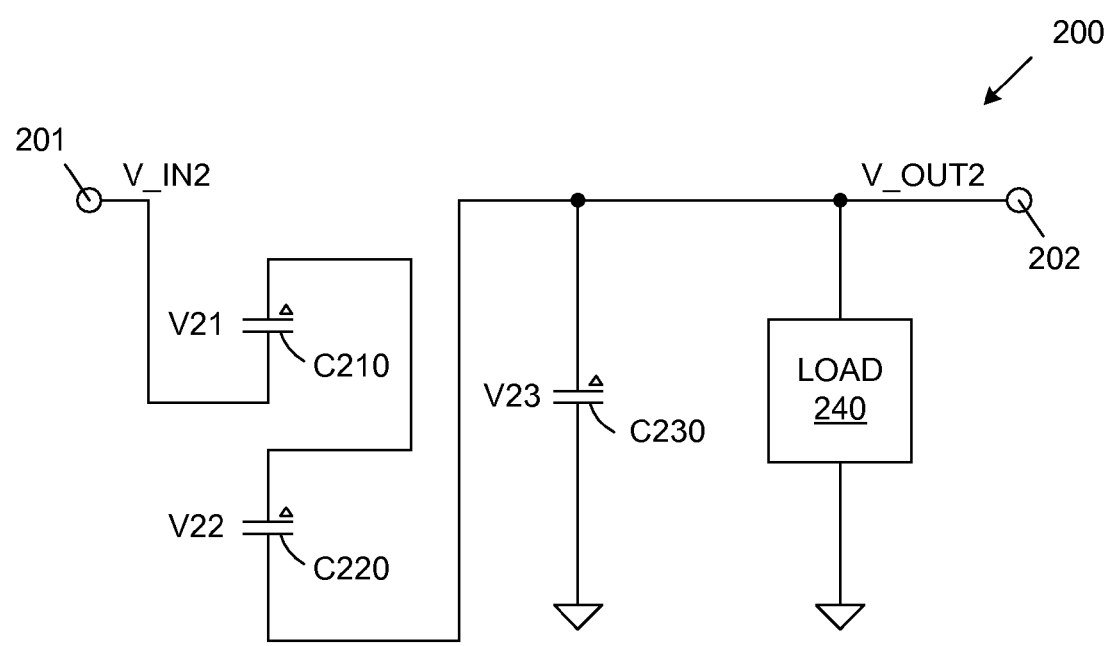

FIGS. 2A, 2B, and 2C are schematic diagrams of an embodiment of a ⅔× charge pump 200 for receiving an input voltage V_IN2 and providing a lower output voltage V_OUT2 to a load D240 (depicted as an LED for exemplary purposes). Charge pump 200 includes an input terminal 201, charging capacitors C210 and C220, a storage (output) capacitor C230, and an output terminal 202. Charge pump 200 also includes interconnect circuitry 205 (e.g., wiring, switches, control logic) for wiring (i.e., providing the electrical paths between) capacitors C210, C220, and C230 in the configurations shown in FIGS. 2A, 2B, and 2C. An exemplary switching configuration for interconnect circuitry is described below with respect to FIG. 2D.

Charge pump 200 operates by switching between the three phases of operation shown in FIGS. 2A, 2B, and 2C. In FIG. 2A, a charging phase is shown, in which capacitors C210 and C220 are serially connected between input terminal 201 and ground. Meanwhile, capacitor C230 is connected between ground and output terminal 202 (load D240 is always connected between output terminal 202 and ground). Note that "ground" can refer to any supply voltage lower than input voltage V_IN2, such that capacitor C230 and load D240 are connected between output terminal 202 and a lower supply voltage terminal (not shown for clarity). In alternate implementation, this charging phase can be omitted as charging can be done also during a subsequent discharge phase.

During the charging phase, capacitors C210 and C220 are charged by input voltage V_IN2 to voltages V21 and V22, while a voltage V23 stored on capacitor C230 is provided as output voltage V_OUT2 for driving load D240. Note that because capacitors C210, C220, and C230 are always either charging or discharging, voltages V21, V22, and V23 are actually average voltages. However, so long as the different operational phases are short enough, the actual changes in voltages V21, V22, and V23 during each phase will be relatively small. Therefore, for descriptive and analytical purposes, voltages V21, V22, and V23 can be considered to be essentially constant.

In the first discharging phase shown in FIG. 2B, capacitor C210 and capacitor C220 remain connected in series between input terminal 201 and ground. However, the common node of capacitors C210 and C220 is connected to output terminal 202. Under these conditions, the potential across capacitor C210 generated during the charging phase is therefore subtracted from the input voltage V_IN2 to generate output voltage V_OUT2 during the first discharging phase shown in FIG. 2B. Thus, during the first discharging phase, output load D240 is driven by, and storage capacitor C230 is charged by, the difference of input voltage V_IN2 and voltage V21 on capacitor C210 (i.e., V_OUT2=V_IN2−V21).

Then, in the second discharging phase shown in FIG. 2C, capacitors C210 and C220 are connected in series between input terminal 201 and output terminal 202, with the orientation of capacitor C210 being inverted compared to the previous discharge phase of FIG. 2B. Specifically, the positive plate (marked with a triangular indicator) of capacitor C210 is connected to the positive plate of capacitor C220, while the negative plate of capacitor C210 is connected to the input terminal 201. The negative plate of capacitor C220 is connected to the output terminal 202. Therefore, during the second discharging phase depicted in FIG. 2C, output voltage V_OUT2 is equal to the sum of input voltage V_IN2 and the voltage V21 across capacitor C210, minus the voltage V22 across capacitor C220 (i.e., V_OUT2=V_IN2+V21−V22). This output voltage V_OUT2 then drives load D240 and charges storage capacitor C230. The process then switches back to the charging phase of FIG. 2A and continues cycling in this manner to provide the desired charge pumping action.

Note that unlike conventional charge pumps (e.g., ½× charge pump 100 of FIGS. 1A-1B), ⅔× charge pump 200 includes three distinct operational phases (as described with respect to FIGS. 2A-2C). Those three phases cause capacitors C210 and C220 to exhibit different nominal voltage potentials (i.e., voltages V21 and V22 will not be equal), and that difference in voltage levels determines the nominal value for output voltage V_OUT2.

To calculate the nominal values for voltages V21 and V22, Kirchoff's Second Law (conservation of voltage) can be used to generate voltage equations for the three phases of operation. Those equations can then be solved for voltages V21 and V22 to determine the relationship between those two voltages. For the charging phase (FIG. 2A), Kirchoff's Second Law states that:

$$V\_IN2=V21+V22 \quad \text{[Eqn. 1]}$$

For the first discharging phase (FIG. 2B), Kirchoff's Second Law states that:

$$V\_OUT2=V\_IN2-V21 \quad \text{[Eqn. 2]}$$

As described above with respect to FIG. 2B, the orientation of capacitor C210 with respect to input terminal 201 during the first discharging phase is inverted from the charging phase to the first discharging phase. Therefore, the voltage potential stored across capacitor 210 during the charging phase is subtracted from the input voltage V_IN2 during the first discharging phase.

Finally, for the second discharging phase (FIG. 2C), Kirchoff's Second Law states that:

$$V\_OUT2=V\_IN2+V21-V22 \qquad [\text{Eqn. 3}]$$

As described above with respect to FIG. 2C, capacitor C210 is connected with a reversed orientation with respect to input terminal 201 during the second discharging phase. Therefore, the voltage potential (V21) across capacitor C210 is added to input voltage V_IN2. However, during the second discharging phase, the orientation of capacitor C220 is same as the orientation during the charging phase. Therefore, the voltage potential (V22) across capacitor C220 is subtracted from the input voltage V_IN2 during the second discharging phase.

Substituting Equation 2 into Equation 3 yields:

$$V\_IN2-V21=V\_IN2+V21-V22 \qquad [\text{Eqn. 4}]$$

which reduces to the following:

$$V22=2*V21 \qquad [\text{Eqn. 5}]$$

Thus, the voltage potential across capacitor C220 (i.e., voltage V22) is twice the magnitude of the voltage potential across capacitor C210 (i.e., voltage V21). Substituting Equation 5 into Equation 1 then yields:

$$V21=(\tfrac{1}{3})*V\_IN2 \qquad [\text{Eqn. 6}]$$

Finally, substituting Equation 6 into Equation 2 yields the following for output voltage V_OUT2:

$$V\_OUT2=(\tfrac{2}{3})*V\_IN2 \qquad [\text{Eqn. 7}]$$

Note that the same result can be derived by substituting Equations 5 and 6 into Equation 3. In either case, charge pump 200 provides a voltage multiplication factor of ⅔.

Figure 2D:
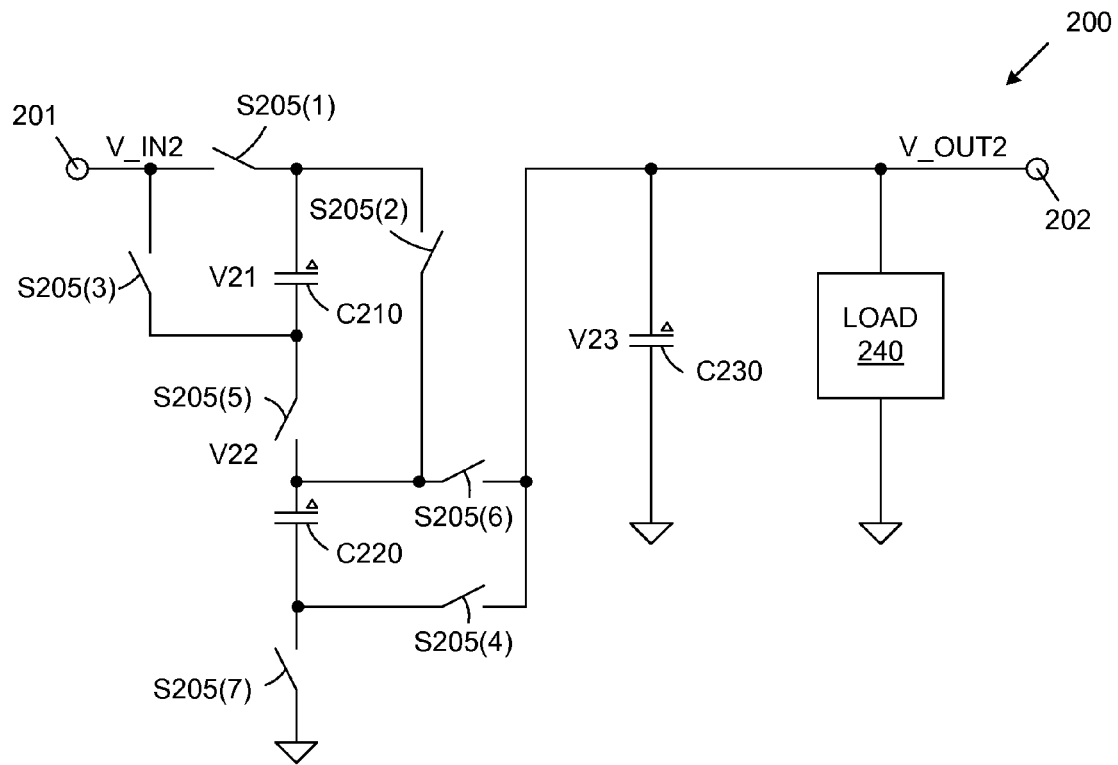
FIG. 2D is a schematic diagram of an exemplary switch configuration for the charge pump of FIGS. 2A-2C.

FIG. 2D shows ⅔× charge pump 200 including an embodiment of interconnect circuitry 205 that includes switches S205(1), S205(2), S205(3), S205(4), S205(5), S205(6), and S205(7). Switches S205(1), S205(2) and s205(6) are connected in series between input terminal 201 and output terminal 202, with the positive plate of capacitor C210 being connected to the junction between switches S205(1) and S205(2). Switch S205(3) is connected between input terminal 201 and the negative plate of capacitor C210, while switch S205(4) is connected between the negative plate of capacitor C220 and the output terminal 202. Switch S205(5) is connected between the negative plate of capacitor C210 and the positive plate of capacitor C220, and switch S205(6) is connected between the positive plate of capacitor C220 and output terminal 202. Finally, switch S205(7) is connected between the negative plate of capacitor C220 and ground.

Thus, during the charging phase, switches S205(1), S205(5), and S205(7) are closed, while the remainder of switches S205 are open, thereby allowing charging of capacitors C210 and C220 as shown in FIG. 2A. Then, during the first discharging phase, switches S205(1), S205(5), S205(7) and S205(6) are closed, and the remainder of switches S205 are opened, thereby connecting capacitors C210 and C220 as shown in FIG. 2B. Note that switch S205(7) can be either open or closed during the first discharging phase, as grounding the negative plate of capacitor C220 during this phase will have no effect on the average charge stored on capacitor C220. Finally, during the second discharging phase, only switches S204(3), S205(2), and S205(4) are closed, thereby connecting capacitors C210 (non-inverted) and C220 (inverted) between input terminal 201 and output terminal 202, as shown in FIG. 2C.

Note further that various other switching configurations can be used to provide additional voltage multiplication factors. For example, by changing the second discharge phase to connect the positive plate of capacitor C220 directly to input terminal 201 and the negative plate of capacitor C220 to output terminal 202, a ½× multiplication factor is obtained. In this case, capacitor C220 obtains the same charge and voltage as capacitor C210 during the first discharge phase. Thus, during the first discharge phase, V_OUT2 is equal to V_IN2 minus V21; and during the second discharge phase, V_OUT2 is equal to V_IN2 minus V22. It therefore follows that V21 is equal to V22, which is equal to V_IN2/2.

Note that due to switch resistance within charge pump 200, output voltage V_OUT2 may not precisely reach ⅔ of input voltage V_IN2. For example, if the combined switch resistance (open loop) across charge pump 200 is 1 ohm during each operational phase, a 100 mA load (D240) and an input voltage V_IN2 equal to 3 V will result in an output voltage V_OUT2 equal to 2.5 V (i.e., 2.5 V=(⅔*3.9 V)−(1Ω*0.1 A)), rather than the ideal output voltage value of 2.6 V (i.e., 2.6 V=⅔*3.9V). Therefore, reducing the switch resistance within charge pump 200 can allow output voltage V_OUT2 to more closely approach the ideal ⅔ multiple of input voltage V_IN2. Note that this does not change the fact that charge pump 200 is a ⅔× charge pump, since the rating of a charge pump is based on operation under ideal conditions (i.e., no losses due to switch resistance, no load, and steady state operation). In general, any circuit incorporating charge pump 200 will operate properly so long as output voltage V_OUT2 provided by charge pump 200 is substantially equal to ⅔ times input voltage V_IN2 (e.g., voltage V_OUT2 is within 5% of ⅔ times voltage V_IN2).

Figure 1A:
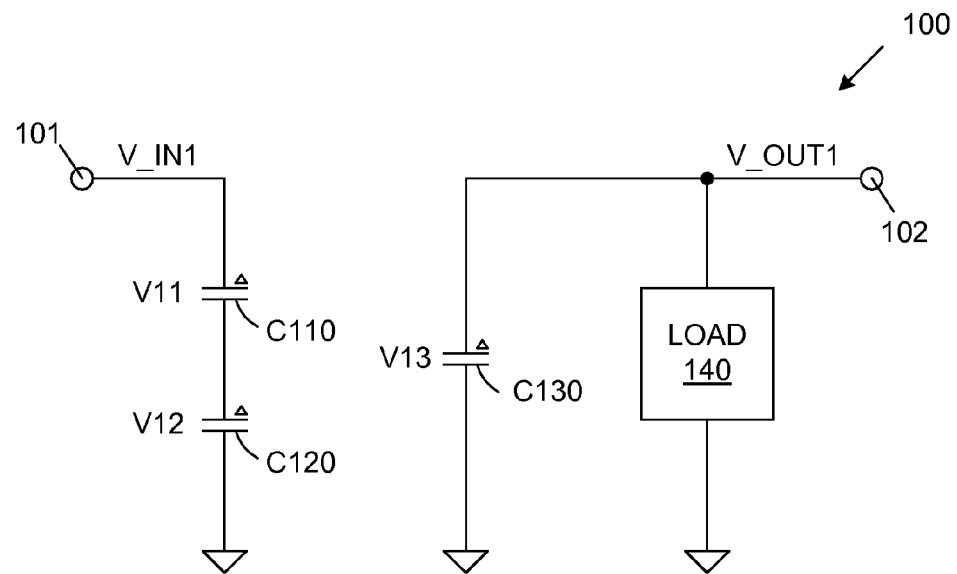
FIGS. 1A and 1B are schematic diagrams of the operation of a conventional ½× charge pump.
Figure 1B:
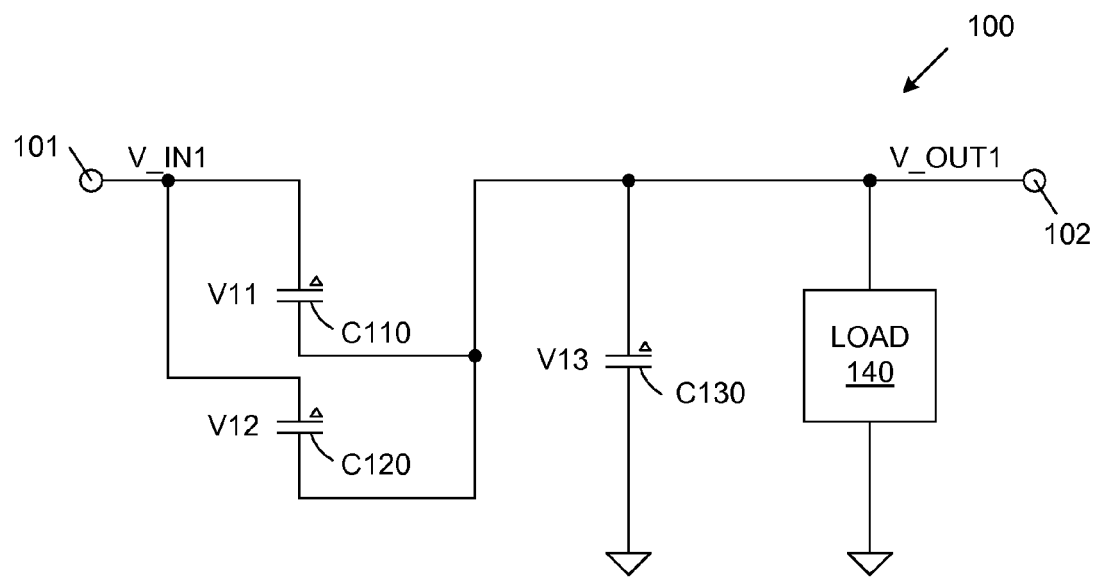
Figure 3:
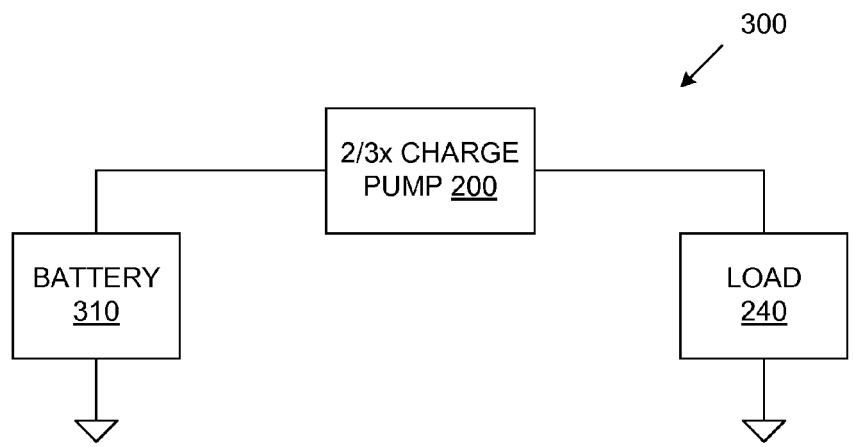
FIG. 3 is a block diagram of an electronic device that incorporates the charge pump of FIGS. 2A-2C.

By providing a ⅔× voltage multiplication factor, charge pump 200 can beneficially provide enhanced power efficiency over conventional ½× charge pumps (i.e., charge pump 100 shown in FIGS. 1A and 1B. For example, FIG. 3 shows a block diagram of a battery-powered device 300 that includes a battery 310, ⅔× charge pump 200, and load circuit 240. Device 300 could, for example, be a cell phone, a personal digital assistant, a portable multimedia device, a digital camera, a video camera, or any other device. Battery 310 can be any type of battery, such as a lithium ion or lithium polymer rechargeable battery providing a nominal voltage VBATT of 3.7 V, with an actual output voltage range between 3.0 V and 4.2 V (other types (and any number) of batteries, such as nickel metal hydride (NiMH) rechargeable or alkaline or lithium primary (non-rechargeable) batteries, among others, could also be used). Note that the particular arrangement (order) of elements within device 300 is purely exemplary, and various other arrangements will be readily apparent.

In alternate embodiments of the present invention, a ⅔ voltage multiplication factor can also be achieved by modifying the first discharging phase of FIG. 2B in the manner described below in connection with FIGS. 4 and 5.

Figure 4:
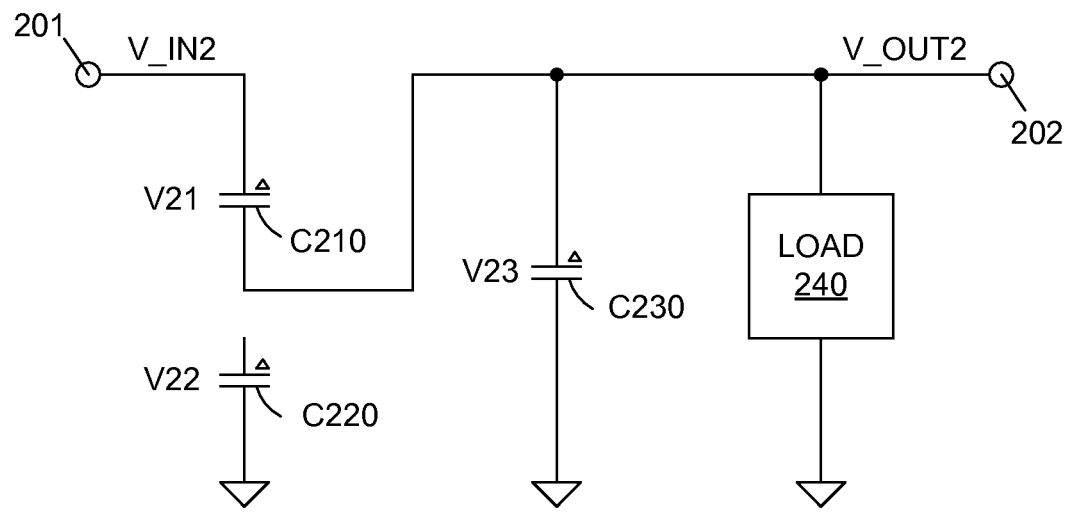
FIGS. 4 and 5 are schematic diagrams of discharge phases of a ⅔× charge pump in accordance with alternate embodiments of the present invention.

FIG. 4 is a circuit diagram illustrating the connection of capacitors C210 and C220 in a first discharging phase in accordance with an alternate embodiment of the present invention. The configuration of FIG. 4 replaces the configuration of FIG. 2B in this embodiment. As illustrated in FIG. 4, capacitor C210 is connected in series between the input terminal 201 and the output terminal 202 (while capacitor C220 is disconnected from both of these terminals 201-202). Under these conditions, the output voltage V_OUT2 has a value of ⅔ V_IN2 because capacitor C210 is connected with the same orientation as in the charging phase of FIG. 2A. As a result, the average output voltage V_OUT2 remains at a value of ⅔ V_IN2.

Figure 5:
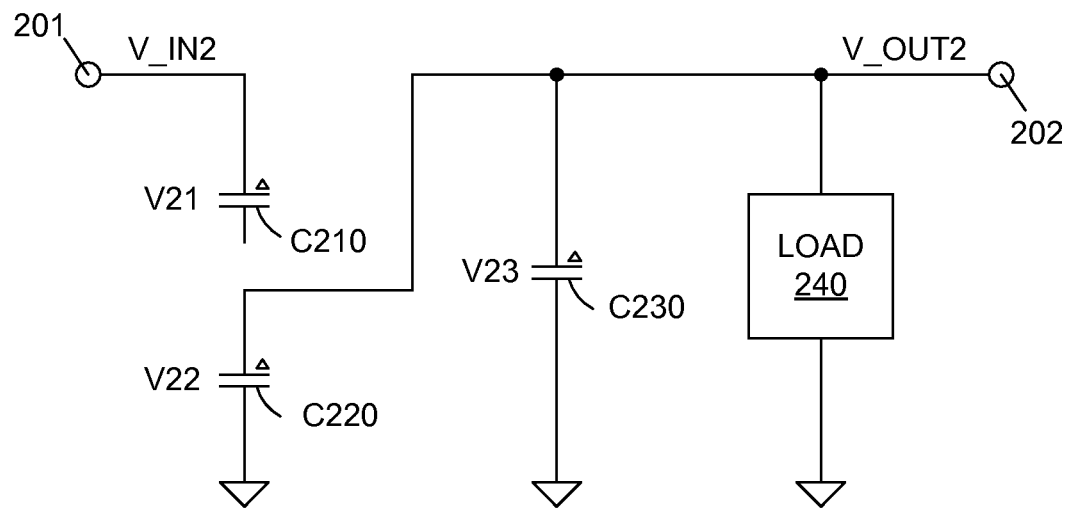

FIG. 5 is a circuit diagram illustrating the connection of capacitors C210 and C220 in a first discharging phase, in accordance with yet another embodiment of the present invention. The configuration of FIG. 5 replaces the configuration of FIG. 2B in this embodiment. As illustrated in FIG. 5, capacitor C220 is connected in series between the ground terminal and the output terminal 202, with an orientation that is opposite the orientation of the charging phase of FIG. 2A. Capacitor C210 is de-coupled from the output terminal 202. As a result, capacitor C220 discharges to the output terminal 202, thereby causing the output voltage V_OUT2 to have a value of ⅔ V_IN2. As a result, the average output voltage V_OUT2 remains at a value of two thirds V_IN2.

In accordance with yet another embodiment of the present invention, the charging phase of FIG. 2A is eliminated, and circuit 300 operates by switching between the configurations of FIGS. 2B and 2C. In this embodiment, capacitors C210 and C220 are charged while circuit 300 is in the configuration of FIG. 2B. At this time, the output voltage V_OUT2 achieves a value of ⅔ V_IN2 (as described above in connection with FIG. 2B). When circuit 300 switches to the configuration of FIG. 2C, the output voltage V_OUT2 remains at an average voltage of ⅔ V_IN2 (as described above in connection with FIG. 2C).

Although the present invention has been described in connection with several embodiments, it is understood that this invention is not limited to the embodiments disclosed, but is capable of various modifications that would be apparent to one of ordinary skill in the art. For example, charge pump 200 could include control logic to allow configuration and operation of capacitors C210 and C220 to provide different voltage multiplication factors. Furthermore, the operation of the charge pump 200 can include more phases, for example, a discharge phase from capacitor C220 alone connected to output node 202 and/or a discharge phase with capacitor C210 alone connected between input node 201 and output node 202. Thus, the invention is limited only by the following claims.

We claim:

1. A charge pump comprising:
   a first input terminal configured to receive a first supply voltage;
   a second input terminal configured to receive a second supply voltage;
   an output terminal configured to provide an output voltage;
   a first capacitor;
   a second capacitor; and
   interconnection circuitry for wiring at least one of the first capacitor and the second capacitor to the input terminal in a first configuration which implements a first operational phase, a second configuration which implements a second operational phase, and a third configuration which implements a third operational phase, wherein the output voltage is less than the first supply voltage during the first, second and third operational phases, and wherein during the first operational phase, the first and second capacitors are coupled in series between the input terminal and the second input terminal, such that the first capacitor is charged to a first capacitor voltage and the second capacitor is charged to a second capacitor voltage, wherein during the second operational phase, the first capacitor is coupled between the first input terminal and the output terminal, such that the output voltage is equal to the first supply voltage minus the first capacitor voltage, and wherein during the third operational phase, the first and second capacitors are coupled in series between the input terminal and the output terminal, such that the output voltage is equal to the first supply voltage plus the first capacitor voltage minus the second capacitor voltage.

2. A charge pump comprising:
   a first input terminal configured to receive a first supply voltage;
   a second input terminal configured to receive a second supply voltage;
   an output terminal configured to provide an output voltage;
   a first capacitor;
   a second capacitor; and
   interconnection circuitry configured to couple the first and second capacitors in series between the first input terminal and the second input terminal to implement a first operational phase, to couple the first capacitor in series between the first input terminal and the output terminal to implement a second operational phase, and to couple the first and second capacitors in series between the first input terminal and the output terminal to implement a third operational phase, wherein the output voltage is less than the first supply voltage during the first, second and third operational phases, and wherein the first capacitor has a first orientation with respect to the first input terminal in the first and second operational phases, and a second orientation, opposite the first orientation, with respect to the first input terminal in the third operational phase.

3. The charge pump of claim 2, wherein the second capacitor has a first orientation with respect to the input terminal in the first and third operational phases.

4. A charge pump comprising:
   a first input terminal configured to receive a first supply voltage;
   a second input terminal configured to receive a second supply voltage;
   an output terminal configured to provide an output voltage;
   a first capacitor;
   a second capacitor; and
   interconnection circuitry configured to couple the first and second capacitors in series between the input terminal and the second input terminal, to implement a first operational phase, to couple the first capacitor in series between the first input terminal and the output terminal to implement a second operational phase, and to couple the first and second capacitors in series between the first input terminal and the output terminal to implement a third operational phase, wherein the output voltage is less than the first supply voltage during the first, second and third operational phases, and wherein in the second operational phase, the first and second capacitors are coupled in series between the first input terminal and the second input terminal.

5. The charge pump of claim 2, wherein in the second operational phase, the second capacitor is not coupled to the first input terminal or the output terminal.

6. The charge pump of claim 1, wherein the average output voltage provided at the output terminal is substantially equal to ⅔ the first supply voltage.

7. The charge pump of claim 1, further comprising an output capacitor which remains coupled to the output terminal during the first, second and third operational phases.

8. The charge pump of claim 1, further comprising control logic for cycling the charge pump through the first operational phase, the second operational phase, and the third operational phase in a repeating sequence.

9. A charge pump comprising:
a first input terminal configured to receive a first supply voltage;
a second input terminal configured to receive a second supply voltage;
an output terminal configured to provide an output voltage;
a first capacitor;
a second capacitor; and
interconnection circuitry configured to couple the first and second capacitors in series between the first and second input terminals to implement a first operational phase, to couple the second capacitor in series between the second input terminal and the output terminal to implement a second operational phase, and to couple the first and second capacitors in series between the first input terminal and the output terminal to implement a third operational phase, wherein the output voltage is less than the first supply voltage during the first, second and third operational phases.

10. The charge pump of claim 9, wherein the first capacitor has a first orientation with respect to the first input terminal in the first operational phase, and a second orientation, opposite the first orientation, with respect to the first input terminal in the third operational phase.

11. The charge pump of claim 10, wherein the second capacitor has a first orientation with respect to the first input terminal in the first and third operational phases.

12. The charge pump of claim 9, wherein the average output voltage provided at the output terminal is substantially equal to ⅔ the first supply voltage.

13. The charge pump of claim 9, further comprising an output capacitor which remains coupled to the output terminal during the first, second and third operational phases.

14. The charge pump of claim 9, further comprising control logic for cycling the charge pump through the first operational phase, the second operational phase, and the third operational phase in a repeating sequence.

15. A charge pump comprising:
a first input terminal configured to receive a first supply voltage;
a second input terminal configured to receive a second supply voltage;
an output terminal configured to provide an output voltage;
a first capacitor;
a second capacitor; and
interconnection circuitry configured to couple the first and second capacitors in series between the first and second input terminals, and also couple the output terminal to a common node coupling the first and second capacitors to implement a first operational phase, the interconnection circuitry further being configured to couple the first and second capacitors in series between the first input terminal and the output terminal to implement a second operational phase, wherein the output voltage is less than the first supply voltage during the first and second operational phases.

16. The charge pump of claim 15, wherein the first capacitor has a first orientation with respect to the first input terminal in the first operational phase, and a second orientation, opposite the first orientation, with respect to the first input terminal in the second operational phase.

17. The charge pump of claim 16, wherein the second capacitor has a first orientation with respect to the first input terminal in the first and second operational phases.

18. The charge pump of claim 15, wherein the average output voltage provided at the output terminal is substantially equal to ⅔ the first supply voltage.

19. The charge pump of claim 15, further comprising an output capacitor which remains coupled to the output terminal during the first and second operational phases.

20. The charge pump of claim 15, further comprising control logic for cycling the charge pump through the first operational phase and the second operational phase in a repeating sequence.

21. A method of operating a charge pump comprising:
receiving a first voltage on a first input terminal;
receiving a second voltage on a second input terminal;
providing an output voltage on an output terminal;
coupling a first capacitor and a second capacitor in series between the first input terminal and the second input terminal during a first operational phase, such that the first capacitor is charged to a first capacitor voltage and the second capacitor is charged to a second capacitor voltage during the first operational phase;
coupling the first capacitor, but not the second capacitor, between the first input terminal and the output terminal during a second operational phase, such that the output voltage is equal to the first supply voltage minus the first capacitor voltage during the second operational phase; and
coupling the first capacitor and the second capacitor in series between the first input terminal and the output terminal during a third operational phase, such that the output voltage is equal to the first supply voltage plus the first capacitor voltage minus the second capacitor voltage during the third operational phase, wherein the output voltage provided on the output terminal is less than the first voltage during the first, second and third operational phases.

22. A method of operating a charge pump comprising:
receiving a first voltage on a first input terminal;
receiving a second voltage on a second input terminal;
providing an output voltage on an output terminal;
coupling a first capacitor and a second capacitor in a first configuration with respect to the first input terminal, the second input terminal and the output terminal during a first operational phase, wherein the first capacitor and the second capacitor are coupled in series between the first input terminal and the second input terminal during the first operational phase;
coupling the first capacitor and the second capacitor in a second configuration with respect to the first input terminal, the second input terminal and the output terminal during a second operational phase, wherein the first capacitor is coupled between the first input terminal and the output terminal during the second operational phase, and wherein the first capacitor is coupled in a first orientation with respect to the first input terminal in the first and second operational phases; and
coupling the first capacitor and the second capacitor in a third configuration with respect to the first input terminal, the second input terminal and the output terminal during a third operational phase, wherein the first capacitor and the second capacitor are coupled in series between the first input terminal and the output terminal during the third operational phase, and wherein the first capacitor is coupled in a second orientation, opposite the first orientation, with respect to the first input terminal in the third operational phase, and wherein the output voltage provided on the output terminal is less than the first voltage during the first, second and third operational phases.

23. The method of claim 22, further comprising coupling the second capacitor in a first orientation with respect to the first input terminal in the first and third operational phases.

24. A method of operating a charge pump comprising:
receiving a first voltage on a first input terminal;
receiving a second voltage on a second input terminal;
providing an output voltage on an output terminal;
coupling a first capacitor and a second capacitor in a first configuration with respect to the first input terminal, the second input terminal and the output terminal during a first operational phase, wherein the first capacitor and the second capacitor are coupled in series between the first input terminal and the second input terminal during the first operational phase;
coupling the first capacitor and the second capacitor in a second configuration with respect to the first input terminal, the second input terminal and the output terminal during a second operational phase, wherein the first capacitor is coupled between the first input terminal and the output terminal, and the first and second capacitors are coupled in series between the first input terminal and the second input terminal during the second operational phase; and coupling the first capacitor and the second capacitor in a third configuration with respect to the first input terminal, the second input terminal and the output terminal during a third operational phase, wherein the first capacitor and the second capacitor are coupled in series between the first input terminal and the output terminal during the third operational phase, and wherein the output voltage provided on the output terminal is less than the first voltage during the first, second and third operational phases.

25. The method of claim 22, further comprising isolating the second capacitor from the input terminal and the output terminal during the second operational phase.

26. The method of claim 21, wherein the average output voltage provided at the output terminal is substantially equal to $\tfrac{2}{3}$ the first voltage.

27. The method of claim 21, further comprising coupling an output capacitor to the output terminal during the first, second and third operational phases.

28. The method of claim 21, further comprising cycling through the first operational phase, the second operational phase, and the third operational phase in a repeating sequence.

* * * * *